US005435942A

United States Patent [19]

Hsu

[11] Patent Number: 5,435,942

[45] Date of Patent: Jul. 25, 1995

[54] PROCESS FOR TREATING ALKALINE WASTES FOR VITRIFICATION

[75] Inventor: Chia-lin W. Hsu, Augusta, Ga.

[73] Assignee: United States Department of Energy, Washington, D.C.

[21] Appl. No.: 202,619

[22] Filed: Feb. 28, 1994

[51] Int. Cl.[6] .......... C09K 11/04

[52] U.S. Cl. .......... 252/625; 588/11; 588/18; 588/20; 588/252; 210/751; 210/757

[58] Field of Search .......... 588/11, 20, 18, 252; 423/162; 210/751, 757; 252/625

[56] References Cited

U.S. PATENT DOCUMENTS

| | | | |
|---|---|---|---|
| 3,673,086 | 6/1972 | Drobnik | 210/59 |
| 4,144,186 | 3/1979 | Drobnik et al. | 422/159 |
| 4,162,230 | 7/1979 | Horwitz et al. | 588/20 |
| 4,202,792 | 5/1980 | Kaufman et al. | 588/11 |
| 4,271,034 | 6/1981 | Gattys | 588/20 |
| 4,943,395 | 7/1990 | Sasaki et al. | 588/11 |
| 5,118,447 | 6/1992 | Cox et al. | 588/20 |
| 5,190,623 | 3/1993 | Sasaki et al. | 204/1.5 |

*Primary Examiner*—Ngoclan Mai

*Attorney, Agent, or Firm*—Brian R. Tumm; Harold M. Dixon; William R. Moser

[57] ABSTRACT

A process for treating alkaline wastes for vitrification. The process involves acidifying the wastes with an oxidizing agent such as nitric acid, then adding formic acid as a reducing agent, and then mixing with glass formers to produce a melter feed. The nitric acid contributes nitrates that act as an oxidant to balance the redox of the melter feed, prevent reduction of certain species to produce conducting metals, and lower the pH of the wastes to a suitable level for melter operation. The formic acid reduces mercury compounds to elemental mercury for removal by steam stripping, and $MnO_2$ to the Mn(II) ion to prevent foaming of the glass melt. The optimum amounts of nitric acid and formic acid are determined in relation to the composition of the wastes, including the concentrations of mercury (II) and $MnO_2$, noble metal compounds, nitrates, formates and so forth. The process minimizes the amount of hydrogen generated during treatment, while producing a redox-balanced feed for effective melter operation and a quality glass product.

20 Claims, 2 Drawing Sheets

PROCESS FOR TREATING ALKALINE WASTES FOR VITRIFICATION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to a process for chemical treatment of materials prior to vitrification. In particular, the present invention relates to a process for treating alkaline waste materials such as radioactive wastes, hazardous chemical wastes, and mixed radioactive,. and hazardous chemical wastes to produce a redox-balanced feed to a vitrification melter, and to a waste glass composition made by the process.

2. Discussion of Background:

Many industrial processes generate hazardous wastes in the form of aqueous. waste streams, sludges and slurries, aqueous supernate, incinerator ash, incinerator off gas condensate, and so forth. As used herein, the term "hazardous waste" means wastes containing substances commonly recognized as hazardous, including but not limited to chemical wastes, high level radioactive wastes, mixed chemical and radioactive; wastes, heavy-metal-containing wastes, and organic chemicals. Hazardous wastes must be treated and stabilized before disposal, for example, by encapsulation in a stable, durable product for long-term storage in an approved facility. Glass is stable and extremely durable, therefore, it is an environmentally acceptable waste form for hazardous wastes, especially radioactive wastes.

Processes for the recovery of actinide elements from spent nuclear fuel generate highly corrosive wastes that must be treated before mixing with glass formers ("frit") in order to ensure a stable, durable glass product. For example, Horwitz, et al. (U.S. Pat. No. 4,162,230) recover americium, curium and rare earths from a feed solution by contacting with nitric acid; neptunium and plutonium are recovered with a combination of nitric acid and formic acid. The aqueous waste solutions generated by the process are combined and solidified for long term storage. Sasaki, et al. (U.S. Pat. No. 5,190,623) lower the corrosiveness of metal ion-containing nitric acid solutions by placing a cathode in the metal ion-containing nitric acid solution and an anode in a nitric acid solution, with a membrane separating the two solutions. When a constant voltage or current is applied between the electrodes, high-valence metal ions (Ru(VIII), Ce(IV), Cr(VI), Fe(III)) in the nitric acid solution are reduced at the cathode to lower-valence, less corrosive states; nitrogen oxides generated by reduction of these high-valence ions provide a reducing atmosphere that prevents lower-valence ions (Ru(III or II), Ce(III), Cr(III), Fe(II)) from being oxidized to higher-valence states. Drobnik, et ,al. (U.S. Pat. No. 4,144,186) and Drobnik (U.S. Pat. No. 3,673,086) add formic acid to nitric acid-containing and/or nitrate-containing wastes that result from reprocessing of irradiated fuels. The formic acid destroys free nitric acid and any transition metal nitrates that are present in the wastes, reduces cations to lower valence states, and reduces noble metal ions to the metallic state. The denitrated wastes are spray-dried, calcinated, mixed with glass formers and vitrified.

FIG. 1 shows a typical waste treatment apparatus 20, where an alkaline waste stream 22 is input into a first vessel 24. Waste stream 22 may contain a variety of hazardous substances, as hereinabove defined. For example, waste stream 22 may result from a nuclear fuel reprocessing operation such as the Purex process, wherein spent fuel is dissolved in nitric acid, uranium and plutonium are recovered by solvent extraction, and various fission products are removed and processed as wastes. Afterwards, sodium hydroxide is added to the acidic waste for storage.

Alkaline wastes, especially wastes with pH greater than approximately 12, have high yield stress and consistency, and are hard to pump. To improve the rheology of waste stream 22, the material in stream 22 is neutralized by mixing it with acid supplied from an acid input stream 26. The acidified material may be transferred to an evaporator 28, where the solids concentration of waste 22 is adjusted by evaporating excess water. Alternatively, the solids concentration of waste 22 is adjusted in vessel 24. Elemental mercury contained in waste 22 is recovered by steam stripping in a second vessel 30. The acidified waste material is transferred to a third vessel 32, where it is mixed with a slurry 34 containing ground glass formers and adjusted to a solids content of no more than approximately 50 wt. % to produce a melter feed 36. Feed 36 is transferred to a melter 38, where it is processed by means well known in the art. Off-gas ($CO_2$, NO, $NO_2$, $H_2$, etc.) generated by acid-base neutralization reactions is vented from evaporator 28, and condensate from vessels 30 and 32 is transferred to a condensate tank 40 for recovery and treatment.

Incoming waste stream 22 is alkaline, and, depending on the source, may contain alkali metal hydroxides, alkaline earth metal hydroxides, transition metal hydroxides, mercury (II) hydroxide, mercury (II) oxide, $MnO_2$, oxides, carbonates, nitrites, nitrates, phosphates, sulfates, and small quantities of noble metals. Mercury is corrosive to the off-gas system of melter 38, and $MnO_2$ in melter feed 36 causes foaming in melter 38. Therefore, waste 22 must be treated with both an acid and a reductant to produce an acceptable melter feed 36: an acid (supplied by stream 26) to lower the pH of the waste, and a reductant to chemically reduce any mercury to Hg for subsequent stream stripping, and reduce $MnO_2$ in the waste.

Waste 22 may be treated by adding formic acid (HCOOH, $CH_2O_2$) via input stream 26. Formic acid is unique in that it functions as both an acid and a chemical reductant or reducing agent: an acid to lower the pH of waste 22, and a reductant to destroy nitrites in the waste, reduce mercury compounds to elemental mercury for steam stripping in vessel 30, and reduce $MnO_2$ to the Mn(II) ($Mn^{++}$) ion to prevent foaming in melter 38. The amount of formic acid that is added to waste 22 depends on the composition of the waste, including the quantities of alkali metal hydroxides, alkaline earth metal hydroxides, carbonates, mercury compounds, $MnO_2$ and nitrites present in the waste. Formic acid may be supplied via input stream 26, or as a constituent of the incoming waste stream.

Use of formic acid as an acidifying and reducing agent results in an acceptable feed for melter 38, however, hydrogen is generated during treatment of waste 22 when the waste contains noble metals such as Rut, Rh and Pd. Formic acid reduces noble metal compounds in waste 22 to metallic states, which then cause some of the remaining formic acid to decompose catalytically into $H_2$ and $CO_2$ as follows:

$$HCOOH \xrightarrow{\text{catalyst}} H_2 + CO_2$$

If only formic acid is used to treat waste 22, the nitrate concentration in melter feed 36 is often insufficient. The formate/nitrate balance is upset and feed 36 is too reducing. An overly reducing melt causes precipitation of metals and/or metal sulfides from feed 36 into melter 38, potentially shorting out the melter electrodes and thereby decreasing melter operating lifetime. In addition, hydrogen gas is generated, and suitable equipment is required to prevent a flammable atmosphere in the process and off-gas vessels.

There is a need for a process for preparing alkaline wastes for vitrification that produces less gaseous hydrogen than presently-used methods, while producing a redox-balanced melter feed that insures a durable vitrified product and proper melter operation. The process should acidify the wastes, reduce mercury compounds in the wastes to elemental mercury, and reduce $MnO_2$ to the Mn(II) ion.

SUMMARY OF THE INVENTION

According to its major aspects and broadly stated, the present invention is a process for treating alkaline waste materials, including high level radioactive wastes, for vitrification. The process involves adjusting the pH of the wastes with nitric acid, adding formic acid (or a process stream containing formic acid) to reduce mercury compounds to elemental mercury and $MnO_2$ to the Mn(II) ion, and mixing with glass formers to produce a melter feed. The process minimizes production of hydrogen due to noble metal-catalyzed formic acid decomposition during treatment, while producing a redox-balanced feed for effective melter operation and a quality glass product.

An important feature of the present invention is the use of different acidifying and reducing agents to treat the wastes. The nitric acid acidities the wastes to improve yield stress and supplies acid for various reactions; then the formic acid reduces mercury compounds to elemental mercury and $MnO_2$ to the Mn(II) ion. When the pH of the waste is lower, reduction of mercury compounds and $MnO_2$ is faster and less formic acid is needed, and the production of hydrogen caused by catalytically-active noble metals is decreased.

Another feature of the invention is the balancing of the redox potential of the melter feed by controlling the relative amounts of nitric acid and formic acid added to the waste. The optimum amounts of nitric acid and formic acid are determined in relation to the composition of the waste, including the concentrations of mercury compounds and $MnO_2$, metal hydroxides, carbonates, alkaline earth compounds, nitrates, sulfates, phosphates, formates and so forth. This feature is especially important when the quality of the final product must be consistent, but the composition of the wastes to be treated may vary.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

It has been determined that production of gaseous hydrogen during treatment of alkaline waste is substantially decreased when the waste is treated with different acidifying and reducing agents so that acidifying can be done before reduction. The treatment involves adding nitric acid to the waste to lower the pH, adding formic acid (or a formic acid-containing process stream), and mixing with glass formers to produce a melter feed. The nitric acid lowers the pH of the wastes to adjust the rheological properties and the redox, acts as an oxidant to balance the redox of the feed, and prevents reduction of conducting metals (including noble metals) to the elemental state. The formic acid reacts with nitrites to produce nitrates, reduces mercury compounds to elemental mercury for removal by stripping, and reduces $MnO_2$ to the Mn(II) ion to prevent foaming of the glass melt. The process minimizes the usage of formic acid and, therefore, hydrogen generation caused by noble metal-catalyzed formic acid decomposition during treatment, while producing a redox-balanced feed for effective melter operation and a quality glass product.

Figure 2:
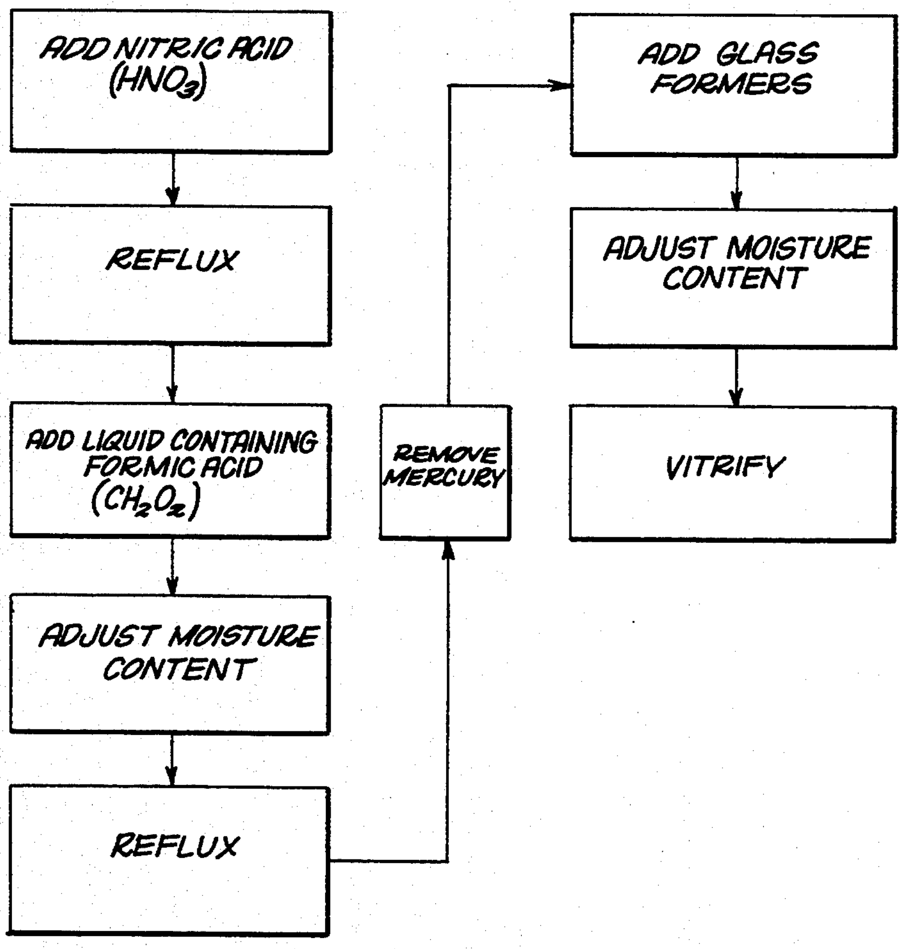
FIG. 2 is a flow chart of a process for treating materials for vitrification according to a preferred embodiment of the present invention.

Referring now to FIG. 2, there is shown a flow chart of a process for treating materials for vitrification according to a preferred embodiment of the present invention. The process is carried out generally as follows:

1. Add nitric acid to the materials to form a first mixture.

The materials to be vitrified are preferably supplied in the form of a sludge or slurry having a solids content no greater than approximately 15 wt. %. Depending on the source or sources thereof, these materials, hereinafter termed "waste," may contain high level radioactive wastes, mixed chemical and radioactive wastes, chemical wastes, heavy-metal-containing wastes, and hazardous organics, in the form of carbonates, nitrates and nitrites, phosphates, sulfates, hydroxides, oxides, halides, formates and other compounds.

Sufficient nitric acid is added to reduce the pH of the waste to less than 7.0, preferably to approximately 4.0, and, later, in combination with the formic acid added in Step 3, to balance the redox of the melter feed. The optimum amount of nitric acid is determined based on an analysis of the composition of the waste, and depends on the nitric acid concentration as well as the composition of the waste itself. For sludges or slurries with a solids content of approximately 15 wt .% or less, addition of approximately 10–50 mL of 8.0M nitric acid per liter of waste is usually sufficient, however, amounts outside this range may also be useful.

The nitric acid is added to the waste at a rate that depends on the amount of waste material to be treated and the acid concentration, preferably at a rate no greater than approximately 1.0 mL/min./L of waste and more preferably approximately 0.5 mL/min./L of waste for 8.0M nitric acid.

2. Reflux the first mixture for approximately one hour.

"Refluxing" means maintaining the first mixture at approximately boiling temperature, while condensing vapors that are evolved by the mixture and returning the condensed vapors to the mixture. Refluxing may be carried out under a nitrogen, argon or air purge in order to control the $H_2$ concentration in the off-gas by dilution. If an air purge is used, air is supplied at a sufficient rate to maintain the hydrogen concentration below the LFL (Lowest Flammable Limit).

As the nitric acid neutralizes the waste, the first mixture evolves off-gas that may include $CO_2$ and nitrogen oxides ($NO_x$, where x=1 or 2). The acid-base neutralization reactions that take place in the first mixture depend on the constituents of the waste, and may include the following:

$$Na^+OH^-+H^+\rightarrow Na^++H_2O$$

$$Ka^+OH^-+H^+\rightarrow K^++H_2O$$

$$Ca(OH)_2+2H^+\rightarrow Ca^{++}+H_2O$$

$$Ba(OH)_2+2H^+\rightarrow Ba^{++}+H_2O$$

$$Mg(OH)_2+2H^+\rightarrow Mg^{++}+H_2O$$

$$CaCO_3+2H^+\rightarrow Ca^{++}+H_2O+CO_2$$

$$Na_2CO_3+2H^+\rightarrow 2Na^++H_2O+CO_2$$

Reactions with nitrites may include the following:

$$2H^++3NO_2^-\rightarrow NO_3^-+2NO+H_2O$$

$$2H^++2NO_2^-\rightarrow CO_2+2H_2O+2NO$$

While not essential for the practice of the invention, refluxing of the first mixture for approximately one hour is preferred to ensure that gas generating reactions with the available acid are near completion before addition of formic acid (Step 3). Refluxing for approximately one hour is usually sufficient. However, the optimum duration of refluxing may vary depending on the amount of waste and the composition of the waste. Alternatively, the first mixture may be refluxed until the $NO_x$ generation rate peaks, that is, until the measured $NO_x$ concentration in the off-gas reaches a maximum and decreases.

3. Prepare a second mixture by adding formic acid to the first mixture while evaporating under a nitrogen or argon purge, or under an air purge with sufficient dilution to maintain the hydrogen concentration lower than the LFL. Alternatively, add a formic acid-containing or formate-containing process stream to the first mixture.

The formic acid (or formic acid-containing liquid) may be added at a constant rate that is approximately equal to the evaporation rate, or added batchwise while evaporating at an approximately constant rate. Formic acid reduces HgO and $MnO_2$ in the waste as follows:

$$HgO+HCOOH\rightarrow Hg+H_2O+CO_2$$

$$MnO_2+HCOOH+2H^+\rightarrow CO_2+Mn^{++}+2H_2O$$

The amount of formic acid/formate is preferably sufficient to chemically reduce the mercury compounds, $MnO_2$, and nitrites in the waste. Therefore, the amount that is supplied depends on the composition of the waste material and the source of the formic acid. By way of example, if the formic acid is supplied in a liquid waste stream that contains approximately 0.2–0.3M formic acid and approximately 23,000 mg/L formate, approximately 1.0–2.0 L of liquid is supplied for each liter of the first mixture.

The optimum addition and evaporation rates depend on the amount of waste material to be treated, the composition of the waste and the concentration of the formic acid that is added. If the formic acid (or formic acid/formate-containing waste stream) is added to the first mixture continuously, the preferred evaporation rate is approximately equal to the formic acid addition rate. If the formic acid is added batchwise, no more than 20% is added at one time, to allow equilibration of the second mixture and reduce the rate of hydrogen generation. Whether the formic acid is added continuously or batchwise, evaporation rates no greater than approximately 10 mL/min./L of the first mixture are preferred.

4. Reflux the second mixture until the hydrogen generation rate peaks, that is., until the measured hydrogen concentration in the off-gas reaches a maximum and decreases. Refluxing may be carried out under a nitrogen, argon, or air purge in order to control the off-gas hydrogen concentration by dilution.

The second mixture, like the first mixture (Step 2), evolves off-gas that may contain $CO_2$, $H_2$, and $NO_x$. Some of the formic acid reduces noble metal compounds in the second mixture to elemental metals, which in turn act as catalysts to generate $H_2$ and $CO_2$ by dissociation of formic acid.

The second mixture is preferably refluxed until the hydrogen generation rate peaks, that is, until the measured hydrogen concentration in the off-gas reaches a maximum and decreases. The optimum time depends on the amount and composition of the waste material being treated, and may range from a few hours to several days or longer.

5. After the hydrogen generation rate of the second mixture peaks, add glass formers to the second mixture to form a third mixture, adjust the solids content, and transfer to a glass melter for vitrification.

Because reduction proceeds slowly at high pH values, lowering the pH of the waste with nitric acid (Step 1) increases the rate of reduction of HgO and $MnO_2$ with formic acid (Steps 3, 4). The process reduces the total amount of formic acid added to the waste material, thereby reducing hydrogen generation due to formic acid decomposition.

As is known in the art, precipitation of conducting metals in a melter can eventually short out the melter electrodes and thereby decrease the melter operating lifetime. The nitric acid (an oxidant) prevents reduction of metals (Cu(II), Ni(II), and so forth) to the elemental state, but aids in reduction of mercury (II) with the formic acid and formate (COOH−) added in Step 3.

Furthermore, the nitrates formed by reaction of the nitric acid with the metal compounds in the waste material (Step 1) act as oxidants to balance the redox potential of the glass melt. The amounts of nitric acid and formic acid to be added to the waste in Steps 1 and 3 depend on the composition of the waste, including the concentrations of oxidants and reductants. Preferably, the reductant:oxidant concentration in the melter feed is maintained within a predetermined range to insure production of a stable, durable waste glass product. The amounts of nitric and formic acid supplied to the wastes, termed the "nitric/formic acid requirement," may be expressed as follows:

$$F-N=C,$$

where F is the amount of formic acid in moles, N the amount of nitric acid in moles, and C is an empirical constant for each particular waste composition. For example, for wastes such as those listed in Table 1, F—N is preferably less than approximately 0.5M.

Figure 1:
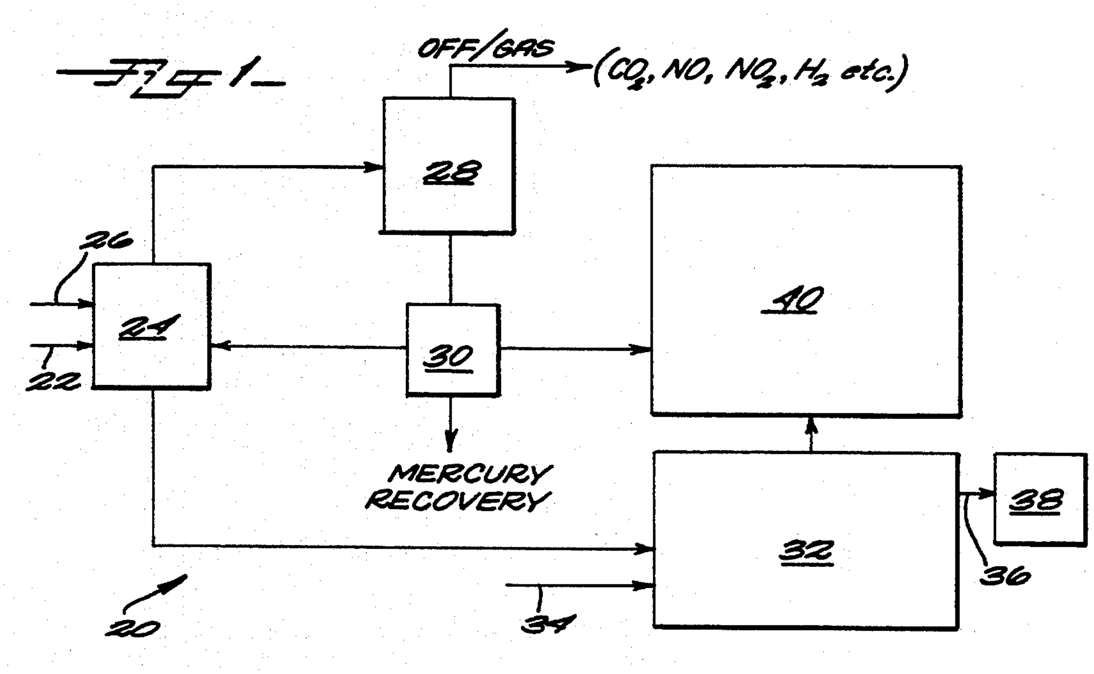
FIG. 1 is a schematic view of an apparatus for treating materials for vitrification.

The process may be implemented in any suitable apparatus, including an apparatus such as that shown in FIG. 1. Nitric acid is preferably added to waste material 22 in vessel 24, however, the nitric acid may be added at any point prior to feeding the treated wastes to melter 38. Formic acid can be added directly to waste 22 in vessel 24. Alternatively, any process stream that contains formic acid and/or formate can be added to waste 22 to supply the necessary reducing agents, for example, waste from ion exchange regeneration processes, precipitate hydrolysis processes, and so forth.

The above-described process was tested using simulated Purex-type sludge, high level waste sludge (Waste A, Waste B), and formate-containing liquid waste (Waste C), the compositions of which are shown in Table 1. The three sludge compositions contained a number of metals, including Hg, Pb, and the noble metals Pd, Rh and Ru, as well as carbonates, nitrates and nitrites, sulfates, phosphates, oxides and hydroxides. Waste C simulated the aqueous hydrolysis precipitate (PHA) produced in a high level waste treatment process, and contained approximately 0.2–0.3M formic acid (HCOOH) and 23,000 mg/L formate (COOH−).

TABLE 1

Composition of Simulated Purex Sludge, Waste A, Waste B, and Waste C. Amounts are listed in dry wt. % unless otherwise noted; values not listed were not determined.

| | Purex | Waste A | Waste B | Waste C |
|---|---|---|---|---|
| Ag | 0.014 | 0.001 | 0.003 | |
| Al | 3.828 | 18.3 | 17.2 | 0.032 |
| B | | 0.004 | 0.0 | 4.356 |
| Ba | 0.275 | 0.11 | 0.06 | |
| Ca | 2.415 | 0.27 | 0.45 | 0.071 |
| Cr | 0.242 | 0.16 | | |
| Cs | 0.003 | | | 0.399 |
| Cu | 0.121 | | | 1.869 |
| Fe | 25.543 | 5.3 | 6.2 | 0.395 |
| Hg | 3.503 | 5.7 | 5.3 | |
| K | 0.223 | | | 12.322 |
| L | | 0.10 | 0.04 | |
| Li | | 0.01 | 0.00 | |
| Mg | 0.242 | 0.22 | 0.24 | 0.129 |
| Mn | 5.83 | 2.6 | 3.9 | 0.013 |
| Na | 4.590 | 9.7 | 9.0 | 12.772 |
| Nd | 0.178 | | | |
| Ni | 2.569 | 1.1 | 0.67 | |
| Pb | 0.381 | | | |
| Pd | 0.095 | 0.002 | 0.002 | |

TABLE 1-continued

Composition of Simulated Purex Sludge, Waste A, Waste B, and Waste C. Amounts are listed in dry wt. % unless otherwise noted; values not listed were not determined.

| | Purex | Waste A | Waste B | Waste C |
|---|---|---|---|---|
| Rh | 0.044 | 0.025 | 0.036 | |
| Ru | 0.219 | 0.082 | 0.13 | |
| Se | 0.004 | | | |
| Si | 0.995 | | | 0.040 |
| U | | 0.02 | 0.02 | |
| Te | 0.049 | | | |
| Th | | 0.08 | 1.3 | |
| Ti | | 0.04 | 0.00 | |
| Zn | 0.260 | 0.35 | 0.34 | |
| Zr | 0.136 | | | |
| $COOH^{-1}$ | | | | 51.612 |
| $CO_3^{-2}$ | 4.005 | | | |
| $NO_3^{-1}$ | 3.115 | 0.066 | 0.285 | 10.247 |
| $NO_2^{-1}$ | 3.020 | 8.364 | 15.307 | |
| $PO_4^{-2}$ | 0.005 | | | |
| $SO_4^{-2}$ | 0.752 | | | 0.23 |
| $Cl^{-1}$ | 1.095 | | | |
| $F^{-1}$ | 0.108 | | | |
| $I^{-1}$ | 0.019 | | | |
| pH | 12.5 | | | 3.7 |
| density (mg/mL) | 1.10 | | | 1.04 |
| total solids (wt. % wet) | 13.8 | 17.0 | 8.3 | 5.1 |
| total organic carbon | 0.05 | | | 18.42 |

The process according to the present invention is illustrated in the following examples:

EXAMPLE 1

A quantity of simulated Purex sludge (2.2 L) was preheated to approximately boiling temperature (between 92° C. and 96° C.). A predetermined amount of 8.2M nitric acid ($HNO_3$) was added to the sludge at a rate of approximately 1.0 mL/min. to form a first mixture. The first mixture was refluxed under a $N_2$ purge of 300 scc/min. for approximately one hour.

Approximately 4.0 L of Waste C was added to the first mixture at a constant rate, while evaporating the resulting second mixture to maintain an approximately constant volume.

Following evaporation, the $N_2$ purge was decreased to approximately 100 scc/min., and the second mixture was refluxed at approximately boiling conditions for a sufficient period to time to ensure that the hydrogen generation rate peaked. Tests were conducted using 42–95 mL nitric acid, Waste C addition/evaporation rates of about 1.0–5.0 mL/min., mercury-containing vs. mercury-free sludge, and irradiated vs. unirradiated Waste C. On-line gas chromatographs were used to analyze the off-gas; these instruments were capable of measuring $H_2$ concentration down to 0.001 vol.% (10 ppm). Gas flow rates were measured with a wet test meter, or determined by the inlet purge rate of argon and the argon content in the gas exiting the system.

Figure 3:
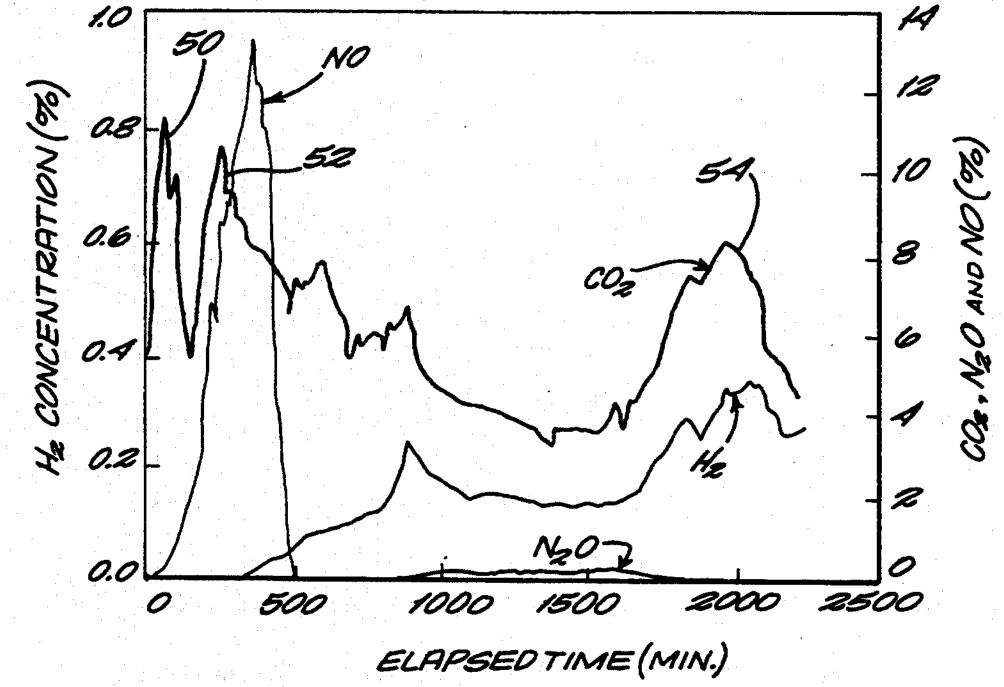
FIG. 3 shows the off-gas concentrations of $H_2$, $CO_2$, NO and $N_2O$ during treatment of simulated Purex sludge by a preferred embodiment of the present process.

Off-gas concentrations of $CO_2$, $H_2$, NO and $N_2O$ during a typical Waste C addition/evaporation cycle (Steps 3 and 4) are shown in FIG. 3. Initial $CO_2$ production (peaks 50, 52) was due to the reaction of the formic acid in the liquid with carbonates in the sludge, whereas the later-evolved $CO_2$ (peak 54) resulted from catalytic decomposition of formates and oxidation-reduction reactions between formic acid and other sludge constituents. Production of NO peaked early in the cycle, whereas $H_2$ production increased rapidly only after the nitrite in the sludge was destroyed (as evidenced by the disappearance of NO).

A substantial portion of the $H_2$ was due to the presence of noble metals in the sludge. Nitric acid alone could not react with the noble metals in the sludge to generate $H_2$, however, during the Waste C addition-/evaporation cycle the quantities of formic acid and formate present in the second mixture were enough to activate the noble metals. Catalytic decomposition of a portion of the formic acid/formate into $H_2$ and $CO_2$ occurred only after reduction of noble metals to the elemental state, thus, $H_2$ was generated in the later part of the cycle. Off-gas $H_2$ concentrations frequently peaked after Waste C addition had ended. When the sludge was treated with formic acid alone, the induction period for hydrogen generation was much shorter, i.e., hydrogen was generated earlier in the Waste C cycle. The time dependence of the measured concentrations of these gases was strongly related to the amount of nitric acid used to treat the sludge prior to addition of Waste C.

The effects of the amount of nitric acid used, the amount of mercury in the sludge, addition and evaporation rate of Waste C, and source of Waste C on the $H_2$ generation rate are listed in Table 2.

TABLE 2

Effects of Nitric Acid, Mercury Content of Sludge, Waste C Addition Rate and Waste C Source on $H_2$ Generation Rate.

| $HNO_3$ (mole/kg sludge) | Hg (wt. % dry) | Waste C (mL/min.) | $H_2$ (mole/min./kg sludge) |
|---|---|---|---|
| Effect of $HNO_3$ Addition | | | |
| 2.33 | 0 | 4-5 | $1.71 \times 10^{-4}$ |
| 1.54 | 0 | 4-5 | $5.80 \times 10^{-5}$ |
| 1.12 | 0 | 4-5 | $9.07 \times 10^{-6}$ |
| Effect of Hg Content | | | |
| 0 | 0 | 4-5 | $5.80 \times 10^{-6}$ |
| 0 | 3.5 | 4-5 | $1.60 \times 10^{-4}$ |
| 1.54 | 0 | 4-5 | $5.80 \times 10^{-5}$ |
| 1.54 | 3.5 | 4-5 | $3.99 \times 10^{-4}$ |
| Effect of Waste C Addition Rate | | | |
| 1.54 | 3.5 | 4-5 | $3.99 \times 10^{-4}$ |
| 1.54 | 3.5 | 1 | $1.46 \times 10^{-4}$ |
| Effect of Waste C Source (Irradiated vs. Unirradiated Sludge) | | | |
| 1.54 | 3.5 | 4-5[a] | $3.99 \times 10^{-4}$ |
| 1.54 | 3.5 | 4-5[b] | $1.19 \times 10^{-4}$ |

[a]Unirradiated Waste C (0.24M formic acid; 23,400 mg/L formate; 950 mg/L Cu)
[b]Irradiated Waste C (0.24M formic acid; 18,700 mg/L formate)

The $H_2$ generation rate increased with an increase in the amount of nitric acid used; however, the observed rates were lower than those found for similar quantities of sludge treated with formic acid alone.

The presence of 3.5 wt. % (dry) mercury in the sludge increased the peak $H_2$ generation rate by a factor of almost 7, from $5.80\times10^{-5}$ to $3.99\times10^{-4}$ mol/-min./kg sludge. However, when the sludge was treated with Waste C alone, the presence of mercury increased the peak $H_2$ generation rate by a factor of 27, from $5.80\times10^{-6}$ to $1.60\times10^{-4}$ mol/min./kg sludge. This effect of mercury was unexpected, since mercury is well known to poison the catalytic activity of noble metals.

The peak $H_2$ generation rate of irradiated Waste C slurry was lower than the peak rate of unirradiated slurry. This effect was even more marked when actual radioactive sludge was used.

By slowing down the Waste C addition/evaporation rate from about 5 nL/min. to about 1 mL/min., the peak $H_2$ generation rate was reduced from $3.99\times10^{-4}$ to $1.46\times10^{-4}$ mol/min./kg sludge; the induction period increased by a factor of about three. These results were due to the effect of the formic acid/formate in the Waste C on the activation of the noble metals in the sludge. The Waste C addition/evaporation rate determined the amount of formic acid/formate entering the system, and therefore affected the rate of activation of the noble metal catalysts and the rate of decomposition of formic acid Therefore, when the Waste C addition-/evaporation cycle was lengthened, catalyst activation and formic acid decomposition were slowed down, resulting in a longer induction period, a lower peak $H_2$ generation rate and less total hydrogen generated.

EXAMPLE 2

Hydrogen generation rates were compared for sludge treated with formic acid alone, and sludge treated with formic acid and nitric acid according to the present invention. The procedure was similar to that described above for Example 1, however, approximately 1.1 L of simulated Purex sludge and 1.6 L of Waste C were used for each test.

Figure 4:
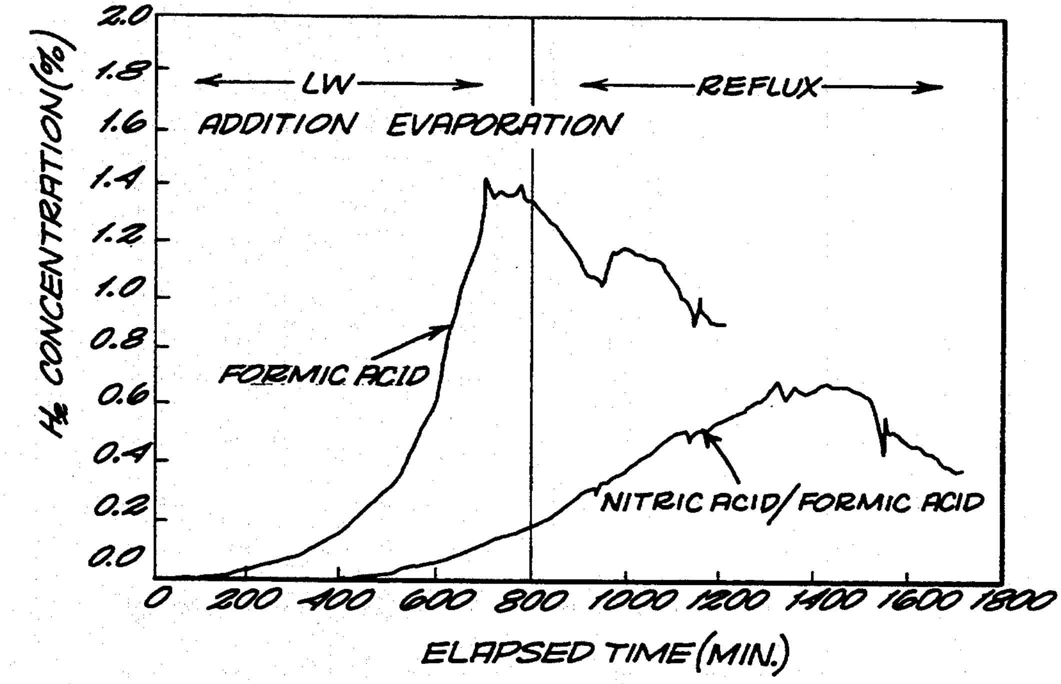
FIG. 4 compares the off-gas $H_2$ concentrations of simulated Purex sludge treated with formic acid according to the prior art process, and sludge treated with a combination of nitric and formic acids according to a preferred embodiment of the present invention.

The off-gas $H_2$ concentrations are shown in FIG. 4. The peak off-gas $H_2$ concentration of the nitric/formic acid-treated sludge was less than half that of the formic acid-treated sludge ($1.86\times10^{-4}$ vs. $4.17\times10^{-4}$ mol/-min./kg sludge). In addition, the formic-acid treated sludge showed a more gradual rise of $H_2$ evolution, and generated much less total $H_2$.

EXAMPLE 3

The procedure was similar to that described above for Example 1. Radioactive sludge (Waste A) was preheated to between 88° C. and 92° C. Nitric acid (8.0M) was added to 0.1 L of the sludge at a rate of 0.05 m.L,/min. Sufficient nitric acid was added to lower the pH of the sludge to about 4.0. A 10 scc/min. argon purge was used during refluxing and evaporation.

A peak hydrogen generation rate of $6\times10^{-5}$ mol/-min./kg sludge was observed, less than one-third the peak rate for a similar quantity of Waste A treated with formic acid alone ($2\times10^{-4}$ mol/min./kg sludge). In addition, the initial rise of $H_2$ evolution was more gradual.

EXAMPLE 4

Radioactive sludge (Waste B) was preheated to between 88° C. and 92° C. Nitric acid (8.0M) was added to 0.1 L of the sludge at a rate of 0.05 mL/min. Since Waste B was significantly less alkaline than Waste A, a 36 vol.% excess of nitric acid was added over that needed to lower the pH of Waste B to about 4.0, in order to provide sufficient nitric acid to oxidize transition metal compounds and noble metal compounds in the sludge. Following refluxing as described in Example 1, Waste C was added in aliquots of 15 mL/hour. Evaporation and refluxing were conducted under a 10 scc/min. argon purge. A peak $H_2$ generation rate of $2\times10^{-4}$ mol/min./kg sludge was observed, one-tenth the peak rate ($2\times10^{-3}$ mol/min./kg) for sludge treated with formic acid alone.

EXAMPLE 5

About 4,160 L of simulated Purex sludge was preheated to between 92° C. and 96° C. About 144 L of 7.5M nitric acid was added at a rate of 1.6 L/min., and refluxed as described above (Example 1). The temperature was increased to boiling conditions in order to add Waste C. Waste C was added in 8 equally sized batches which totaled 7,950 L., while evaporation was carried out at a rate of about 2.65 L/min. The $H_2$ generation rate peaked during the Waste C addition/evaporation cycle, thus, there was no need to reflux the system following evaporation.

The peak $H_2$ generation rate of $1.38\times10^{-4}$ mol/-min./kg sludge occurred about two-thirds of the way through the Waste C addition/ evaporation cycle. This rate was a factor of 4–5 lower than peak $H_2$ generation rates found for similar quantities of sludge treated with formic acid alone. Both the induction period and the peak rate were comparable to those found in the series of tests described under Example 1 above.

As noted above, the treatment of HLW sludge requires both an acid and a reductant. The process of the present invention uses nitric acid as the acid, and formic acid as the reductant. The process was demonstrated with simulated and actual HLW sludge, in amounts ranging from bench scale to production scale (0.1 L–4,000 L). In all of the above-described tests, the total amount of $H_2$ produced was lower, the peak $H_2$ generation rate was lower by a factor of two or more, the increase in the hydrogen generation rate was more gradual, and the induction period was greater than for waste materials treated with formic acid alone. Thus, use of the process provides an increased margin of safety as regards the risk of hydrogen deflagrations, as well as reduced costs in the design and production of process vessel vent systems. The process is compatible with a wide range of HLW wastes as well as other hazardous wastes, and is the key to maintaining a proper redox balance of the melter feed for producing a stable, durable glass product.

It will be apparent to those skilled in the art that many changes and substitutions can be made to the preferred embodiment herein described without departing from the spirit and scope of the present invention as defined by the appended claims.

What is claimed is:

1. A process for treating an alkaline material for vitrification, said alkaline material includes metal compounds, wherein said metal compounds may include noble metals, mercury compounds and $MnO_2$, said process comprising the steps of:

adding nitric acid to said alkaline material to form a first mixture having a pH between approximately 4 and approximately 7; and adding formic acid to said first mixture to form a second mixture, said formic acid added so that said second mixture equilibrates, said formic acid reducing said noble metals to elemental noble metals, said mercury compounds to elemental mercury and said $MnO_2$ compounds to Mn(II), said second mixture generating hydrogen as said elemental noble metals catalyze decomposition of said formic acid.

2. The process as recited in claim 1, further comprising the step of heating said first mixture while adding said formic acid to said first mixture to form a second mixture.

3. The process as recited in claim 2, wherein said first mixture evaporates during said heating step, and wherein said formic acid is added to said first mixture at a rate approximately equal to the rate at which said first mixture evaporates.

4. The process as recited in claim 1, wherein said formic acid is added batchwise to said first mixture.

5. The process as recited in claim 1, wherein hydrogen is generated at a rate and said process further comprises the step of refluxing said second mixture until said hydrogen rate peaks.

6. The process as recited in claim 1, wherein said first mixture generates $NO_x$ at a rate and said process further comprises the step of refluxing said first mixture until said rate of $NO_x$ generation peaks.

7. The process as recited in claim 1, further comprising the steps of:

mixing glass formers with said second mixture to form a third mixture; and vitrifying said third mixture.

8. The process as recited in claim 1, wherein said first mixture is refluxed under a purge gas selected from the group consisting of nitrogen, argon and air.

9. The process as recited in claim 1, wherein said second mixture is refluxed under a purge gas selected from the group consisting of nitrogen, argon and air.

10. The process as recited in claim 1, wherein said nitric acid is 8M nitric acid and said nitric acid is added at a rate no greater than approximately 1.0 mL/min./L of said alkaline material.

11. A process for treating an alkaline material for vitrification, said alkaline material includes metal compounds, wherein said metal compounds may include noble metals, mercury compounds and $MnO_2$, said process comprising the steps of:

adding nitric acid to said alkaline material to form a first mixture, said first mixture having a pH between approximately 4 and approximately 7;

heating said first mixture;

adding formic acid to said first mixture during heating to form a second mixture, said formic acid added slowly enough so that said second mixture equilibrates, said formic acid reducing said noble metals to elemental noble metals, said mercury compounds to elemental mercury and said $MnO_2$ compounds to Mn(II), said second mixture generating hydrogen said elemental noble metals catalyze decomposition of said formic acid;

adding glass formers to said second mixture to form a third mixture; and vitrifying said third mixture.

12. The process as recited in claim 11, wherein said first mixture is refluxed under a purge gas selected from the group consisting of nitrogen, argon, and air.

13. The process as recited in claim 11, wherein said second mixture is refluxed under a purge gas selected from the group consisting of nitrogen, argon and air.

14. The process as recited in claim 11, wherein said first mixture evaporates during said heating step, and wherein said formic acid is added to said first mixture at a rate approximately equal to the rate at which said first mixture evaporates.

15. The process as recited in claim 11, wherein said material has a formate concentration and a nitrate concentration, said formate and nitrate concentrations having a difference, and wherein said nitric acid-adding step further comprises adding a sufficient quantity of nitric acid to said material to adjust said difference to within a predetermined range.

16. The process as recited in claim 11, further comprising the steps of:

removing elemental mercury from said second mixture;

after said hydrogen concentration peaks, mixing glass formers with said second mixture to form a third mixture; and vitrifing said third mixture.

17. A waste glass product, said product made by a process comprising the steps of:

adding nitric acid to an alkaline material to form a first mixture having a pH between approximately 4 and approximately 7, wherein said alkaline material includes noble metals, mercury compounds and $MnO_2$; and adding formic acid to said first mixture to form a second mixture, wherein said addition step is carried out while evaporating said second mixture being formed, said formic acid being added slowly so that said second mixture equilibrates, said formic acid reducing said noble metals to elemental noble metals, said mercury compounds to elemental mercury and said $MnO_2$ compounds to Mn(II), said second mixture generating hydrogen as said elemental noble metals catalyze decomposition of said formic acid to hydrogen and carbon dioxide;

adding glass formers to said second mixture to form a third mixture; and vitrifying said third mixture.

18. The product as recited in claim 17, wherein said hydrogen is generated at a rate and said process further comprises the step of refluxing sa id second mixture until said hydrogen rate peaks.

19. The product as recited in claim 17, wherein said first mixture evolves $NO_x$ at a rate and said process further comprises refluxing said first mixture until said rate of $NO_x$ generation peaks.

20. The product as recited in claim 17, wherein said second mixture is refluxed under a purge selected from the group consisting of nitrogen, argon, and air.

* * * * *